Nov. 25, 1969 P. C. BURFIELD ET AL 3,479,728
METHOD OF MAKING A UNITIZED SEAL

United States Patent Office 3,479,728
Patented Nov. 25, 1969

3,479,728
METHOD OF MAKING A UNITIZED SEAL
Peter C. Burfield, Birmingham, Mich., and Louis Z. Micai, Bellevue, Wash., assignors to Federal-Mogul Corporation, Detroit, Mich., a corporation of Michigan
Application Jan. 18, 1968, Ser. No. 707,344, which is a continuation-in-part of application Ser. No. 527,455, Feb. 15, 1966. Divided and this application Nov. 18, 1968, Ser. No. 794,456
Int. Cl. B21d 39/00; B23p 11/02
U.S. Cl. 29—450                    10 Claims

ABSTRACT OF THE DISCLOSURE

This unitized seal has a radial shaft-sealing member with at least one sealing lip and a novel two-piece wear sleeve assembly. A main element of the wear sleeve assembly has an axial wear sleeve portion engaging the sealing lip or lips and provided on one side of the sealing lip or lips with a step leading to a thinned terminal portion on one end; on the other end is a radial flange. A secondary element provides another radial flange and is abutted against the step, the terminal portion being turned radially and engaging the secondary element, thereby unitizing the seal. The secondary element may be a simple washer, a stepped washer, or a washer with a short axial flange abutted against the step. In the last instance, the main element may have two steps, each leading to successively thinner portions and providing a short cylindrical portion between them on which the short axial flange of the secondary element is supported. In any event, the step or steps are provided by thinning the metal on the lip-engaging side only, leaving the shaft-engaging side smooth and cylindrical.

Figure 1:
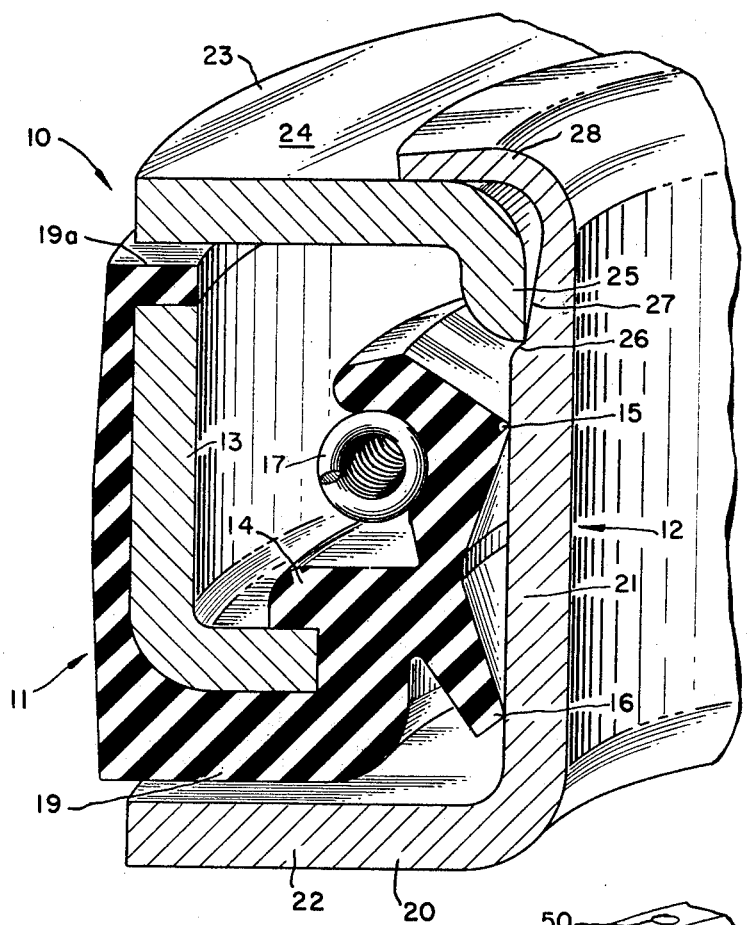

The method for making the unitized seal comprises: (1) forming a main annular wear sleeve element from a flat metal sheet, to provide a flat radial flange and a cylindrical wear sleeve portion, the wear sleeve portion being pinched off to provide a step followed by a tapered thinner terminal portion at the end distant from said radial flange, (2) forming a secondary annular element from sheet metal to provide a radial flange and a pierce intermediate in diameter between the wear sleeve portion and the terminal portion; if there is a short axial flange it has a pinch-off end; the radial flange may be stepped or flat, (3) inserting an annular sealing element on the wear sleeve, (4) inserting the secondary element on the main element so that it abuts the step and the radial flanges lie on opposite sides of the sealing element at the opposite ends of the seal, and (5) closing the terminal portion tightly against the radial portion of the secondary element.

---

This application is a division of application Ser. No. 707,344 filed Jan. 18, 1968, which was a continuation-in-part of application Ser. No. 527,455, filed Feb. 15, 1966, now abandoned.

This invention relates to an improved method for making unitized seals.

By the term "unitized seal" is meant a non-detachable assembly of a radial shaft seal and a wear ring on which the seal element runs, instead of running on the shaft or bore. Unitized seals become particularly attractive in environments where the rough surfaces of shafts or bores have tended to wear out the sealing element or where the sealing element has tended to wear grooves into shafts or bores. By combining a wear sleeve having a good wear surface with a shaft seal of the radial lip type to make a single unitized assembly, both seal life and shaft or bore life can be increased. Moreover, the assembly can be replaced as a unit without having to replace or regrind the shaft or bore. Further, the installation procedure is simplified, and alignment between the wear ring and the sealing element is assured. Unitized seals have also been attractive because it is possible to provide them with accurately located oil flingers, in the form of a radially extending flange which can serve both as one of the unitizing flanges and to fling oil.

However, unitization has led to certain problems. In trying to provide both a good wear sleeve, an oil flinger, and a retainer to key the assembly together, it has been proposed to nest two L-shaped members with their axial cylindrical portions together and their radial flanges at opposite ends, both outside the seal member. Unfortunately, most structures of this type have tended to leak around the seal, passing between the nested metal members, sometimes even when gaskets were provided between the two L-shaped members.

Another problem is that unitized seals have often taken up too much space and so have not been feasible in applications where there is little space.

Another problem has been that of expense. To combine a wear sleeve with the seal has raised the cost of manufacture considerably, as compared with the cost of a seal alone, especially when there had to be gaskets to prevent leakage around the place where the lip or lips of the sealing member rotatably engage the wear sleeve. When the wear sleeve included a step, there was an extra forming operation with the added disadvantage of reducing the bearing surface on the shaft.

The present invention provides a relatively inexpensive and leak-free unitized seal, requiring no gaskets, fitting into a narrow space, conserving metal and metal handling dies and holding assembly operations to a minimum cost. Thus, a better seal can be provided at lower cost.

Other objects and advantages of the invention will appear from the following description of some preferred embodiments.

Figure 2:
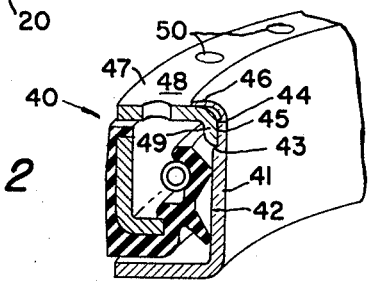
Figure 3:
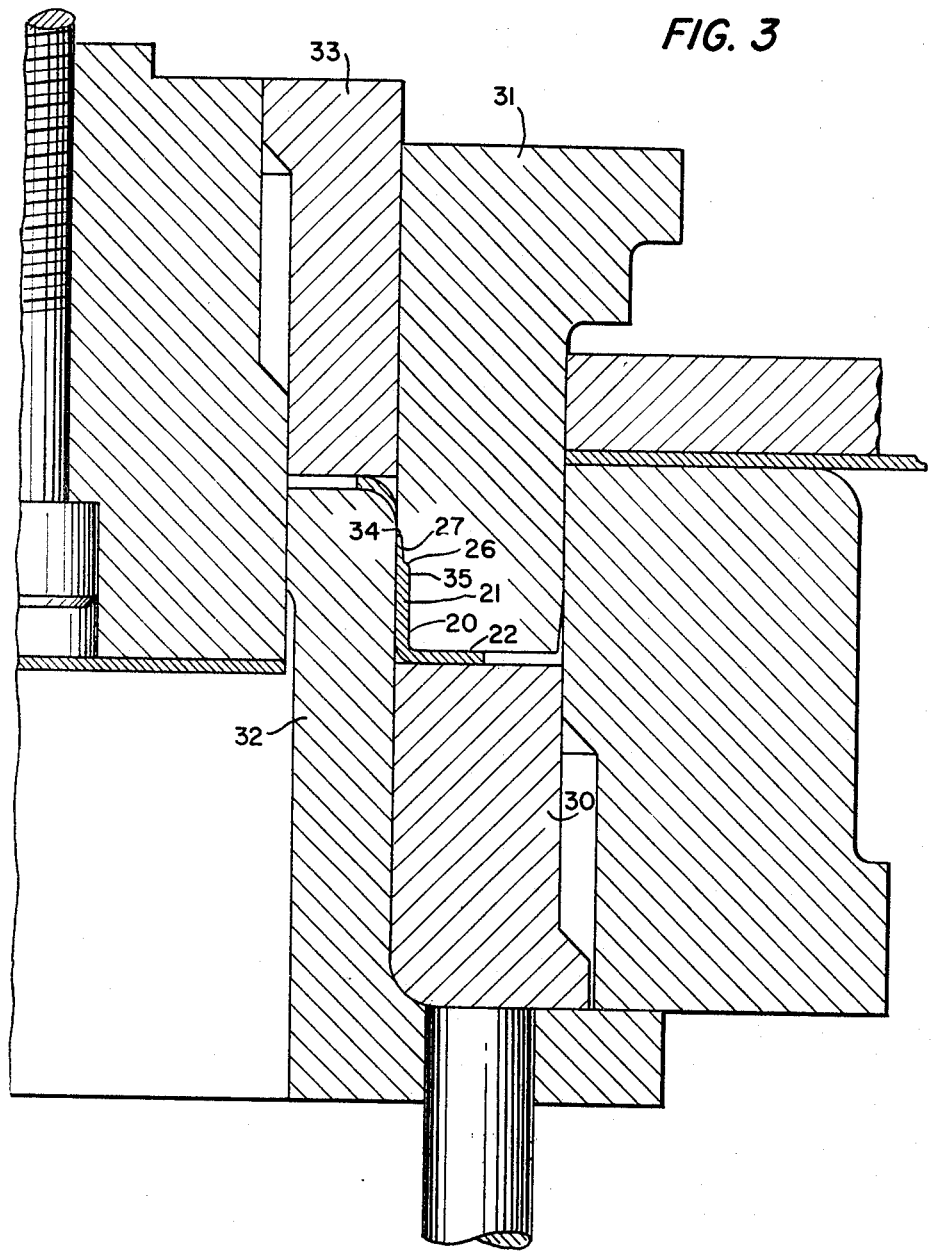
Figure 7:
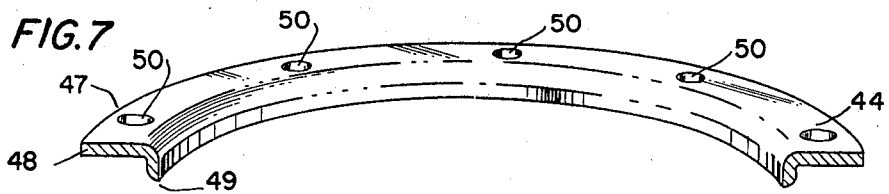
Figure 8:
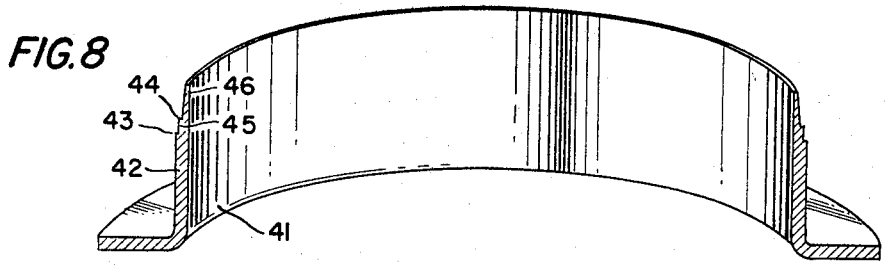
Figure 5:
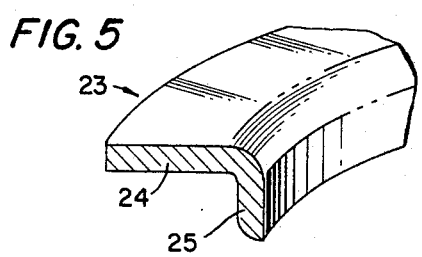
Figure 6:
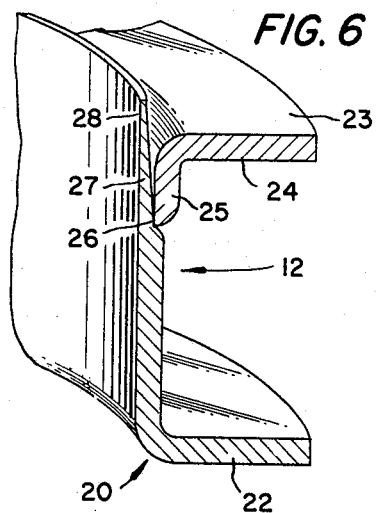
Figure 4:
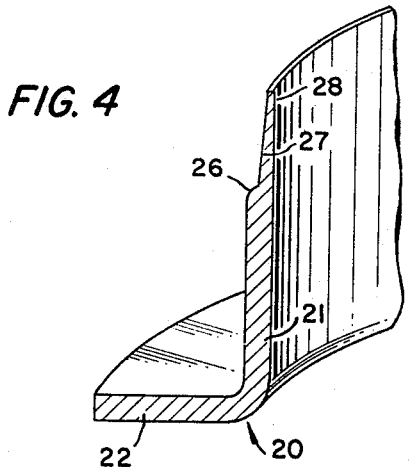
Figure 9:
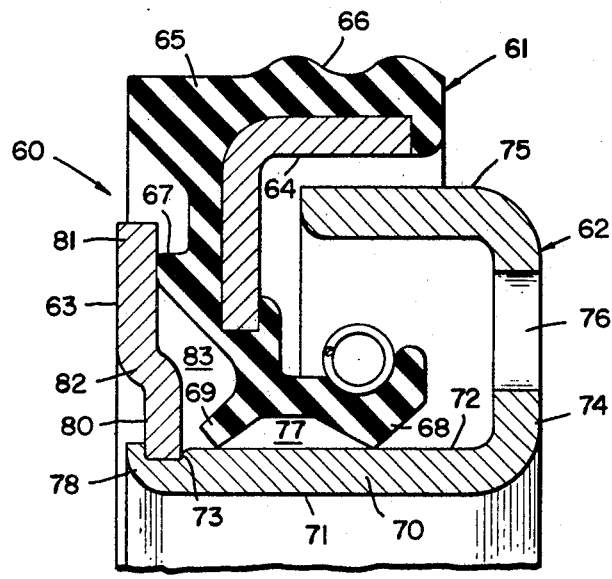
Figure 10:
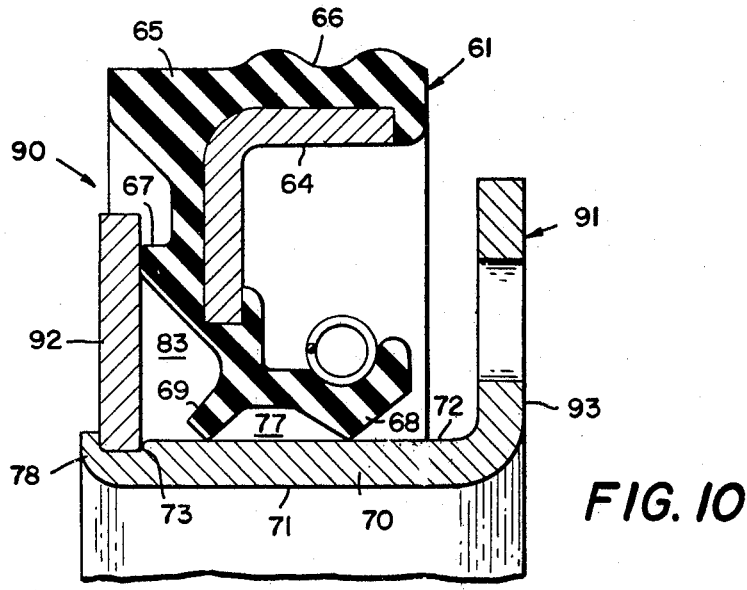

In the drawings:

FIG. 1 is a fragmentary view in elevation and in section of a unitized seal embodying the principles of the invention, FIG. 2 is a similar view on a smaller scale of a modified form of unitized seal, also embodying the principles of the invention, FIG. 3 is an enlarged fragmentary view in elevation and in section of apparatus for making the main element of the wear sleeve, and showing a preferred method of manufacture of that element, FIG. 4 is an enlarged fragmentary sectional view of the main wear sleeve element, as formed by the apparatus of FIG. 3, FIG. 5 is a view similar to FIG. 4 of the other wear sleeve element, which provides the oil flinger and retainer, FIG. 6 is a view generally similar to FIGS. 4 and 5 showing how those two parts fit together before closing, the seal being omitted for the sake of clarity, FIG. 7 is a view like FIG. 5 of a modified form of that element, FIG. 8 is a view like FIG. 4 of a modified form of that element, FIG. 9 is a fragmentary view in section of a modified form of unitized seal assembly also embodying the invention, and FIG. 10 is a view similar to FIG. 9 of another modified form of unitized seal assembly of the invention.

One form of unitized seal 10 of the invention is shown in FIG. 1 and comprises a continuous annular radial lip shaft seal 11 and a continuous annular wear sleeve assembly 12. The shaft seal 11 may take various forms, preferably comprising a reinforcing case 13 and an elastomeric portion 14 providing one or more sealing lips 15 and 16.

The use of an oil-sealing lip 15 with a garter spring 17 and a dust-excluding lip 16 is good, but not essential, since one lip corresponding to the lip 15 can be used, and use of the spring 17 is not always required. The elastomeric body 14 may also cover the outer surface of the case 13 with a portion 18 and engage the bore in which the device 10 is to be installed. In addition there are preferably radially extending elastomeric portions 19 and 19a for limiting engagement with the wear sleeve assembly 12.

The wear sleeve assembly 12 is novel. (See FIGS. 1, 4, 5 and 6.) It comprises (1) a main member 20 having an axial wear sleeve 21 and a radial flange 22, and (2) a second member 23 having a retainer and oil flinging radial portion 24 and a short axial flange 25, preferably made by a pinch trim as more effective and less expensive than formed steps. The member 20 is preferably made by a pinching-off operation as shown in FIG. 3. It is, however, provided with a step 26 on the one side only and a thinned tapered portion 27. This means that the full inner periphery of the member 20 can and does engage the shaft, unlike a member having a formed step and no thinned portion. The flange 25 of the member 23 is made to a size so that it fits over the portion 27 with its edge against the step 26, and then a terminal portion 28 of the portion 27 is closed, preferably by die closing, though it may be spun over, to complete unitization of the seal 10 and to hold the member 23 in place. The step 26 lies entirely to one side of the lip 15 in all positions of the lip 15; hence, there is no possibility of leakage around the lips. This is a very important feature of the invention, the positive assurance of no leakage. Also significant is the positive location of the member 23 and its oil-slinging flange 24. The two flanges 22 and 24 lie on opposite sides of the seal 11 and hence unitize it. By having the edge of the flange 24 bear against the step 26, space is utilized to the maximum.

As shown in FIG. 3, the sleeve 20 may be made by an ironing and pinch-off operation starting with sheet metal, much as sheet steel. Die members 30 and 31 grasp an outer rim portion (later to be the flange 22) and punch out the blank; the members 30 and 31 soon bottom and move no further. Then die members 32 and 33 push in the center of the blank and form it axially. The die 31 is shaped to provide the desired axial configuration of the portion 21, and the die members 32 and 33 move down to iron the metal to the shape of the die 31 and to pinch off the metal at the edge 34, while meanwhile thinning it along the portion 27. The step 26 is provided by the step 35 in the die 31. The pinch trim of the member 23 is similar but simpler.

FIG. 2 (also see FIGS. 7 and 8) shows a modified form of seal 40 wherein a wear sleeve member 41 has an axial portion 42 with two steps 43 and 44, defining a cylindrical portion 45 between them, followed by a tapered portion 46. In manufacture, the main difference is in a more complex shape of a die member replacing the die 31. In function, it helps when using an oil slinger member 47 with a longer radial flange 48 by providing a longer support for the axial flange 49 along the cylindrical portion 45 between the two steps 43 and 44. The additional support is most useful in seals of large diameter where narrow axial seal width is also a requirement, to prevent possible cocking of the member 47. The slinger 47 is shown with oil-admitting openings 50 therethrough on the *oil* side of the seal, a structure which can be used in either embodiment.

Another modified form of unitized seal 60 embodying the principles of the invention is shown in FIG. 9. It, too, includes a metal-reinforced elastomeric oil sealing element 61, a wear sleeve member 62, and a unitizing element 63. The principal differences are: (1) that the unitizing element 63 has no axial flange, because such a flange is not necessary for many installations, so that cost can be further reduced and so can the seal's cross-sectional width; and (2) that the unitizing element is on the opposite end of the unit 60. The reason for this latter difference is that in certain installations of the seal on axles, the closure member was hammered on and damaged; in the FIG. 9 seal the opposite end is the one to be hammered, so that the likelihood of damage in such an installation is reduced.

Considering the unit 60 in more detail, the element 61 has a cup-like metal reinforcing member 64 covered exteriorly with and bonded to an elastomeric member 65 having a bore-engaging periphery 66, a bumper or spacing portion 67, and two lips 68 and 69, the lip 68 being used for retaining oil and the lip 69 for excluding dirt.

The wear-sleeve element 62 has a cylindrical portion 70 with a shaft-engaging inner periphery 71 and a lip-engaging outer periphery 72. A step 73 in the outer periphery 72 may be made as described earlier, by thinning the metal while pinch-trimming it. An oil-flinging flange 74 may lead from the cylindrical portion to an outer stiffening portion 75 that enables the flange 74 to withstand hammering without damage. A series of openings 76 assures access of oil to the lip 68 at all times. Grease is usually packed in the space 77 between the lips 68 and 69.

The element 63 may be a simple flat washer, but here is shown as stepped to provide a radially inner flat radial portion 80 and a similar outer portion 81, joined by a step 82. This enables use of a shorter cylindrical portion 70 and reduces the total cross-sectional seal width. An end portion 78 of the thinned portion of the wear sleeve is curled up to hold the washer element 63 in place. The element 63 may engage the bumper 67, and grease is usually packed in the space 83.

In FIG. 10 is a unit 90 generally like the unit 60 but having some differences. Its seal unit 61 is identical, but it has a wear sleeve member 91 without the stiffening portion 75 and a unitizing element 92 that is a simple flat washer. The seal unit 61 has a flinger portion 93 like the flange 74.

To those skilled in the art to which this invention relates, many additional changes in construction and widely differing embodiments of the invention will suggest themselves without departing from the spirit and scope of the invention as defined in the claims.

What is claimed is:

1. A method for making a unitized seal comprising:
   forming a main annular wear sleeve element from a flat metal sheet to provide a flat radial flange and a cylindrical wear sleeve portion, said wear sleeve portion being pinched off to provide a step followed by a tapered thinned terminal portion at the end distant from said radial flange,
   forming a secondary annular element from sheet metal to provide a radial retaining wall and a pierce intermediate in diameter between said wear sleeve portion and said terminal portion,
   inserting an annular sealing element on said wear sleeve,
   inserting said secondary element on said main element so that it abuts said step and said radial flange and said radial retaining wall lie on opposite sides of said sealing element at the opposite ends of the seal, and
   closing said terminal portion tightly against the radial retaining wall of said secondary element.

2. The method of claim 1 wherein said secondary element is a simple radial washer.

3. The method of claim 1 wherein said secondary element is a flat washer that is formed prior to assembly with an offset joining two radial portions.

4. The method of claim 1 wherein said secondary annular element is formed before assembly to provide a short axial flange with a pinched off end that abuts said step on assembly.

5. The method of claim 4 wherein said main element is formed to provide two steps with a cylindrical portion in between them on which said secondary element is assembled and on which it rests.

6. A method for making a unitized seal comprising:
punching out an annular main wear sleeve element from a flat metal sheet,
holding said element by a flat radial portion while forming radially inside said radial portion a cylindrical wear sleeve portion having a step followed by a tapered thinned terminal portion at the end distant from said radial portion,
pinching off the end of said wear sleeve terminal portion,
punching out a secondary blank from flat sheet metal to provide a secondary element having a radial portion and a pierce that is larger than the outer diameter of most of said terminal portion but smaller than the outer diameter of said cylindrical wear sleeve portion,
inserting a sealing element having elastomeric lip means on said main element with said lip means engaging said cylindrical wear sleeve portion,
inserting said secondary element on said main element and abutting it against said step, said radial portions being on opposite sides of said sealing element, and
closing said terminal portion tightly against the radial portion of said secondary element.

7. The method of claim 6 wherein the step of punching out said secondary blank is all the work done on said secondary blank before assembly, said secondary blank being a flat washer.

8. The method of claim 6 wherein the step of punching out said secondary blank is followed by forming the punched-out blank into a washer having two radial portions joined by a shallow offset.

9. The method of claim 6 wherein said secondary element is formed from the punched-out blank to provide a short axial flange and is pinch trimmed there before assembly, the axial flange abutting said step when inserted.

10. The method of claim 9 wherein said cylindrical wear sleeve portion is formed to provide two steps and a cylindrical portion in between said steps, said short axial flange resting on the cylindrical portion between said steps.

References Cited

UNITED STATES PATENTS

| | | |
|---|---|---|
| 613,602 | 11/1898 | Prouty. |
| 2,127,982 | 8/1938 | Northup et al. _____ 29—511 |
| 2,225,758 | 12/1940 | Stein _____ 29—511 X |
| 2,982,999 | 5/1961 | Stewart. |
| 3,021,161 | 2/1962 | Rhoads et al. _____ 277—39 X |
| 3,179,424 | 4/1965 | Carson et al. _____ 277—39 X |
| 3,223,062 | 12/1965 | Mulder. |
| 3,275,333 | 9/1966 | Scott et al. _____ 277—39 |
| 3,352,006 | 11/1967 | Satoh et al. _____ 29—512 |

CHARLIE T. MOON, Primary Examiner

U.S. Cl. X.R.

29—512, 523; 277—39